United States Patent [19]

Watanabe

[11] Patent Number: 5,330,779
[45] Date of Patent: * Jul. 19, 1994

[54] MATERIAL FOR FOOD AND METHOD FOR PRODUCTION THEREOF

[75] Inventor: Makoto Watanabe, Nakakoma, Japan

[73] Assignee: Terumo Kabushiki Kaisha, Tokyo, Japan

[*] Notice: The portion of the term of this patent subsequent to Sep. 21, 2010 has been disclaimed.

[21] Appl. No.: 724,765

[22] Filed: Jul. 2, 1991

[30] Foreign Application Priority Data

Jul. 3, 1990 [JP] Japan .................................. 2-176640
Jul. 3, 1990 [JP] Japan .................................. 2-176641
Jul. 3, 1990 [JP] Japan .................................. 2-176642

[51] Int. Cl.$^5$ ........................... A21D 2/16; A23L 1/10
[52] U.S. Cl. ...................................... 426/549; 426/19; 426/557; 426/653; 426/804; 514/866; 514/910; 514/911
[58] Field of Search ................. 426/549, 557, 653, 19, 426/804; 514/866, 910, 911

[56] References Cited

U.S. PATENT DOCUMENTS 4,483,880 11/1984 Koizumi et al. .................... 426/549
4,748,027 5/1988 Schou et al. .

FOREIGN PATENT DOCUMENTS 0154039 9/1985 European Pat. Off. .
0388319 9/1990 European Pat. Off. .
63-129956 11/1988 Japan .
882238 11/1961 United Kingdom .

OTHER PUBLICATIONS

Jenkins et al, Am. J. Clin. Nut., vol. 34, Mar. 1981, pp. 362-366.
Jenkins et al, Diabetologia, vol. 23, pp. 477-484.
Collier et al, Diabetologia, vol. 23, pp. 50-54.

Primary Examiner—Donald E. Czaja
Assistant Examiner—Mary S. Mims
Attorney, Agent, or Firm—Burns, Doane, Swecker & Mathis

[57] ABSTRACT

A material for food of slow digestion and absorption, characterized by comprising a starchy material having an amylose content in the range of from about 25 to about 60% by weight and a modifier for modifying said starchy material and having the enzymatic reaction ratio with amylase decreased to not more than 95% of unmodified starchy material.

20 Claims, No Drawings

MATERIAL FOR FOOD AND METHOD FOR PRODUCTION THEREOF

BACKGROUND OF THE INVENTION

1. Field of the Invention

This invention relates to a material for food and a method for the production thereof. More particularly, this invention relates to a material for food which is digested and absorbed at a slow rate and a method for the production thereof.

In recent years, the patients of obesity due to enhancement of eating habits are sharply increasing in advanced societies. Persons of a high level of obesity are two to three times as susceptible of diabetes, atherosclerosis, cardiopathy, etc. Such diseases as gout, postoperative complications, cholelithiasis, lumgago, and hepatopathy which are associated with obesity are growing incessantly in prevalence. Thus, the obesity has come to pose itself a serious problem in social health.

2. Description of the Prior Art

The practice of decreasing the caloric intake has been heretofore regarded as a worthwhile measure to cure and prevent the obesity. Since this practice compels the patient to feel the sensation of hunger and even starvation and discourages him from continuing the painful chore, however, it is usually performed in conjunction with one of the following methods.

One of the methods consists in appreciably narrowing the inner volume of the patient's stomach by setting a balloon fast inside the stomach or filling up the greater part of the stomach so that a small food intake may impart the stimulus of mechanical expansion to the stomach. The method of this nature, however, is undesirable because it is a permanent measure necessitating a surgical operation and possibly entailing a secondary effect.

Another method consists in causing the patient to eat an extender such as dietary fibers and an adhesion enhancer optionally as mixed with other food. This method aims to lower the caloric value of food per unit weight by utilizing the nature that dietary fibers are non-digestive. Since the dietary fibers have unpleasant taste and palatability, they have the disadvantage that they cannot be easily ingested by themselves in a large amount and, even when used in conjunction with meal, they seriously impair the taste and palatability of the meal in most cases. Further, generous injection of dietary fibers is undesirable because it prevents the absorption of other beneficial nutrients and entails such secondary effects as diarrhea and constipation.

It has been recently demonstrated that carbohydrates which are digestively absorbed slowly are not closely associable with obesity as compared with carbohydrates which are digestively absorbed rapidly [Jenkins, D. J. A., et al., Am. J. Clin. Nutr. 34 1981, pp. 362–366]. It is, therefore, logically concluded that effective prevention and alleviation of obesity can be attained by using food containing carbohydrates of slow digestive absorption instead of resorting to the practice of observing a low caloric intake.

Further, the use of this food checks the otherwise possible sharp increase of the postprandial blood sugar content [Jenkins, D. J. A., et al.: The Diabetic Diet, Dietary Carbohydrate and Differences in Digestibility, Diabetologia, 23:477–484 (1982): Collier, et al.: Effect of co-ingestion of fat on the metabolic responses to slowly and rapidly absorbed carbohydrates, Diabetologia, 25: 50–54 (1984)]. It is, therefore, inferred that the use of this food facilitates management of the morbidity and nutrition of a patient of diabetes.

As carbohydrates of slow digestive absorption, the so-called high-amylose corn starch prepared from amylomaze and various carbohydrates cooked in combination with a large volume of oil or fat have been known heretofore to the art. The former carbohydrate finds no appreciable utility because it is useful only in a limited range of applications and is deficient in taste and palatability. The latter carbohydrates are not effective in combating diabetes because they bring about an addition to the caloric intake.

An object of this invention, therefore, is to provide a novel material for food and a method for the production thereof. A further object of this invention is to provide a material for food which is digested and absorbed at a slow rate and which produces taste and texture equivalent to those of ordinary starch and finds extensive utility, and a method for the production thereof.

SUMMARY OF THE INVENTION

To accomplish the objects described above, the present invention is directed to a material for food capable of slow digestion and absorption, characterized by comprising a starchy material having an amylose content in the range of from about 25 to about 60% by weight and a modifying agent for modifying the starchy material and having the enzymatic digestion ratio with amylase decreased to not more than 95% of the unmodified starchy material.

For this invention, the modifying agent is desired to be a saccharide other than D-glucose or to be a fatty acid compound.

In one preferred embodiment of this invention, the material for food comprises a starchy material having an amylose-content in the range of about 25 to about 60% by weight and a fatty acid compound bound to the starchy material and possesses an amylose binding ratio of not less than 10% in the starchy material with the fatty acid compound.

Further, the fatty acid compound is desired to be an amphipathic substance, preferably a fatty acid ester.

The material for food according with this invention, when the modifier thereof is a saccharide other than D-glucose, can be produced by mixing a starchy material having an amylose content in the range of from about 25 to about 60% by weight, a saccharide other than D-glucose, and an acid and heat-treating the resultant mixture.

The material, when the modifier thereof is a fatty acid compound, can be produced by bringing a starchy material having an amylose content in the range of from about 25 to about 60% by weight and a fatty acid compound into contact with each other in the presence of a solvent.

Desirably, the production of the material for food is attained by a method which consists in mixing 100 parts by weight of a starchy material having an amylose content in the range of from about 25 to about 60% by weight with 0.5 to 20 parts by weight of a fatty acid compound in the presence of 1 to 20 parts by weight of a solvent at a temperature incapable of gelatinizing the starchy material under a pressure exceeding 1 kgf/cm$^2$, preferably falling in the range of from 2 to 20 kgf/cm$^2$.

DETAILED DESCRIPTION OF THE INVENTION

The material for food of the present invention comprises a starchy material and a modifier for modifying the starchy material. As the starchy material, the material for food of the present invention uses a starchy material which has an amylose content in the range of from about 25 to about 60% by weight. This starchy material, by the addition thereto of the modifier, is rendered sparingly susceptible to the action of a digesting enzyme and, as a result, the enzymatic digestion ratio thereof with the amylase is decreased to not more than 95% of the unmodified starchy material.

The present inventor made a variety of studies on modification of starches in the hope of developing a material for food capable of slow digestion and absorption, to acquire a knowledge that when the enzymatic digestion ratio of the starchy material with the amylase is decreased to not more than 95% of the unmodified starchy material by the action of the modifier, the in vivo digestion and absorption of the food using the consequently produced material is significantly retarded without reference to the kind of a material to be used. The inventor continued a diligent study, to learn that the starchy material is conspicuously susceptible to the action of the modifier when this starchy material has an amylose content in the range of from about 25 to about 60% by weight.

Generally, the starch originating in a cereal has an amylose content of less than 25%. The starchy material of the kind having an amylose content approximately in the range of from about 25 to about 60% by weight as contemplated by this invention is digested and absorbed more slowly than the staple starch originating in a cereal. In one preferred embodiment of this invention, the material for food may use a fatty acid compound as a modifier. In this case, the decrease of the susceptibility of the starchy material to the action of such a digesting enzyme as the amylase may be logically explained by a postulate that the hydrophobic moiety of the amylose in the starchy material forms a complex with the fatty acid compound and consequently gives rise to a structure sparingly capable of forming a complex with the enzyme. It has been found incredibly that when the starch used for the material has an amylose content in the range of from about 25 to about 60% by weight, this material manifests a far more conspicuous effect of retarding the digestion and absorption than may be imagined from the postulate mentioned above.

Further, it is desirable that the material for food according to this invention has an enzymatic digestion ratio with the amylase of not more than 85%, more preferably not more than 70% of the unmodified starchy material Now, the present invention will be described in detail below with reference to embodiments thereof.

The starchy material to be used as a raw material in the present invention is adapted to possess an amylose content in the range of from about 25 to about 60% by weight, preferably from about 30 to about 50% by weight.

As universally known, starch consists of the two components, i.e. amylose and amylopectin. The starch originating in a cereal such as, for example, the starch prepared from rice, corn, barley, rye, oat, maize, potato, sweet potato, or tapioca invariably has an amylose content of less than 25%. The reason for the higher amylose content in the starchy material to be used in the present invention than in the staple starch originating in the cereal is that in the retardation of digestion and absorption by the modifier to be described more specifically hereinbelow, the use of this modifier in a small amount suffices to effect fully satisfactory modification of this starchy material of the higher amylose content and, as a result, the otherwise possibility of the starchy material's flavor and texture being impaired by the use of the modifier in a large amount is eliminated. If the starchy material has an amylose content exceeding 60% by weight, there arises the possibility that the starchy material's own flavor and texture will be notably impaired and the food's digestion and absorption will be unduly curbed by the modifier as well.

The starchy material having an amylose content in the range of from about 25 to about 60% by weight as described above may be a starch originating in a cereal, a physicochemically or biologically synthesized starch, a crude raw material for such a starch, or a processed product of such a starch. The starches of high amylose contents which are relatively readily available at present are the so-called high-amylose corn starch (amylose content about 70%) prepared from maize of the amylomaize species and pure amylose (amylose content 100%). Thus, the starchy material which is obtained by mixing a starch of such a high amylose content as described above, particularly the high-amylose corn starch, with the aforementioned staple starch originating in a cereal in proportions such that the resultant mixture acquires an amylose content in the aforementioned range of from about 25 to about 60% by weight is advantageously used in this invention.

In the material for food of the present invention, various modifiers are available for the purpose of modifying the starchy material having an amylose content in the range of from about 25 to about 60% by weight as described above. These modifiers include saccharides other than D-glucose and fatty acid compounds to be cited hereinbelow, for example.

The saccharides other than D-glucose which form one class of modifiers usable for embodying the material for food of the present invention include monosaccharides and oligosaccharides, for example. These saccharides may be used either singly or jointly in the form of a mixture of two or more members. The oligosaccharides are desired to comprise two to ten constituent monosaccharides. The saccharides which are advantageously usable herein include fructose, xylose, sucrose, fractooligosaccharide, polydextrose, and cyclodextrose, for example.

When a saccharide of this class is bound to the starchy material having an amylose content in the range of from about 25 to about 60% by weight in a mode of starch union other than the $\alpha$-1,4 and $\alpha$-1,6 unions, since this union produces a structure different from the structure obtained with an ordinary starch, the regions neighboring the sites of saccharide union become unsusceptible to the action of a digesting enzyme such as the amylase.

To bind a starchy material having amylose content in the range of from about 25 to about 60% by weight with a saccharide other than D-glucose can be accomplished by thoroughly mixing the starchy material and the saccharide in combination with an acid as a catalyst and subsequently heat-treating the resultant homogeneous mixture.

The acids usable as the catalyst herein include the inorganic acids and organic acids which are generally accepted for use in foodstuffs. These acids may be used either singly or jointly in the form of a mixture of two or more members. To be more specific, hydrochloride, phosphoric acid, succinic acid, and citric acid are advantageously usable herein.

In the case of binding a starchy material having an amylose content in the range of from about 25 to about 60% by weight with a saccharide other than D-glucose, though the proportions of the saccharide and an acid to be used therein are affected by the amylose content of the starchy material and other conditions to be used, it is generally advantageous that the proportion of the saccharide is in the range of from 1 to 20 parts by weight and that of the acid in the range of from 0.1 to 5 parts by weight, based on 100 parts by weight of the starchy material.

The most important factor for successful union between a starchy material having an amylose content in the range of from 25 to 65% by weight and a saccharide other than D-glucose consists in the conditions for the heat treatment. If the temperature of the heat treatment is unduly low, the reaction for union of the starchy material with the saccharide proceeds only with difficulty. Conversely, if this temperature is unduly high, the starchy material will be conspicuously denatured and, when this starchy material happens to be a cereal, for example, the cereal will be transformed with browning possibly to the extent of not only having the flavor and palatability thereof impaired but also undergoing conversion into the so-called food fibers which are unsusceptible to the action of a digesting enzyme. Though the conditions for the heat treatment are variable with the kind and amount of the saccharide to be bound to the starchy material, this heat treatment is desired to be carried out at a temperature in the range of from 50° to 250° C., preferably from 150° to 220° C., for a period in the range of 30 minutes to 24 hours. In preparation for this heat treatment, the starchy material, the saccharide, and the acid must be homogeneously mixed. This mixing may be performed in the dry form or the wet form, whichever may suit the occasion. For the purpose of enabling the subsequent heat treatment to proceed effectively, this mixing treatment is desired to give the resultant mixture a water content of not less than 20% by weight. Since this mixing treatment is thought to be accompanied by a dehydrating reaction, the mixture ready for the heat treatment is desired to be effectively deprived of its water content by vaporization under a reduced pressure. Further, in binding the saccharide with the starchy material, the mixture which has undergone the heat treatment is desired to be washed for removal of the saccharide and the acid which have survived the union. For this washing, water or an ethanol-water mixture can be advantageously used. In this case, the solid-liquid separation of the washed mixture is carried out very easily because the starchy material which has undergone the treatment mentioned above is inherently insoluble in water. When the union of the saccharide to the starchy material has been carried out as described above, however, the removal of the unaltered saccharide and acid is not always required. The unaltered residues may be left remaining in the product of union by reason of seasoning without departing from the spirit of this invention.

The fatty acid compounds which form another class of modifiers usable for embodying the material for food of the present invention include free fatty acids, fatty acid salts, and fatty acid esters. These fatty acid compounds can be used more desirably when they possess a hydrophobic alkyl (fatty acid chain) moiety available for the formation of a complex with the starchy material mentioned above and a hydrophilic moiety, for example, hydroxyl group, available for efficient contact with the starchy material. In this respect, the fatty acid esters are preferred over the other fatty acid compounds mentioned above. For the reason given above, those fatty acid compounds which are destitute of such hydrophilic group as triacylglycerol cannot be used in this invention. The term "fatty acid ester" as used herein means a substance formed by the bind between one or more saturated or unsaturated alkyl compounds possessing one or more carboxyl group and one ore more compound possessing one or more alkolic hydroxyl groups (alcohol donor) through the medium of an ester bonds. The fatty acid as a component of the fatty acid compound is desired to have 8 to 22 carbon atoms. The fatty acids which answer this description include caprylic acid, peralgonic acid, caprio acid, undecylic acid, lauric acid, tridecylic acid, myristic acid, pentadecylic acid, palmitic acid, heptadecylic acid, stearic acid, nonadecanoic acid, arachic acid, behenic acid, undecylenic acid, oleic acid, elaidic acid, cetoleic acid, erucic acid, brassidic acid, linclic acid, linoleic acid, and arachidonic acid, for example.

The fatty acid salts which are usable herein include sodium salts, potassium salts, magnesium salts, etc. of the fatty acids enumerated above.

The alcohol donors owned by the fatty acid esters include glycerols, propylene glycols or polypropylene glycols, saccharides such as sucrose and reduced maltose, sugar alcohols such as sorbitol, mannitol, erythritol, and arabitol, and glycerophosphoric acid, for example. As concrete examples of the fatty acid esters, there may be cited glycerin fatty acid esters such as decaglycerol monolaurate, decaglycerol monomyristate, hexaglycerol monostearate, decaglycerol monostearate, monoglycerol monostearate, decaglycerol distearate, decaglycerol tristearate, decaglycerol monocleate, decaglycerol trioleate, hexaglycerol monocleate, and decaglycerol pentaoleate, sucrose fatty acid esters such as sucrose stearate, sucrose palmirate, sucrose oleate, sucrose laurate, and sucrose behanate, sorbitan fatty acid esters such as sorbitan monolaurate, sorbitan monostearate, and sorbitan monocleate, and lecithin, and lysolecithine. The HLB (hydrophilic lipophilic balance) of such a fatty acid ester to be used in this invention may fall in any range.

This fatty acid compound is believed to bind itself to the amylose moiety of the aforementioned starchy material and consequently give rise to a structure hardly capable of forming a complex with an enzyme, with the result that the starchy material will become highly unsusceptible to the action of a digesting enzyme such as the amylase. In the embodiment of the invention using a fatty acid compound as the modifier as described above, when the requirement for decreasing the enzymatic digestion ratio with the amylase to not more than 95% of the unaltered starchy material is satisfied, the amylose binding ratio it not less than 10% in the starchy material with the fatty acid compound, though this ratio is variable with the kind of the starchy material to be used, especially the amylose content of the starchy material, the kind of the fatty acid compound, and the production conditions.

The expression "amylose binding ratio in the starchy material with the fatty acid compound" as used in this specification refers to the factor which defines the binding ratio of the starchy material and the fatty acid compound used as raw materials and which is calculated based on the affinity of the product of union for iodine (the combined amount of amylose and iodine participating in the union) to be determined by the amperometry. Specifically, the affinity of a given sample for iodine serves as a criterion for the estimation of an amylose content in the sample based on the principle that iodine binds itself mainly to the amylose in the starchy material and gives rise to a complex. When a starchy material is treated with a fatty acid compound as in the material for food of the present invention, the affinity of the product of the treatment is decreased below that of the unaltered starchy material by the proportion of the amylose (which avoids the union with iodine) bound to the fatty acid compound. The value which is obtained by subtracting the affinity of the treated starchy material for iodine from the affinity of the unaltered starchy material for iodine, dividing the difference by the affinity of the unaltered starchy material for iodine, and multiplying the quotient by 100 as represented by the following equation, therefore, is reported as the amylose binding ratio (%) in the starchy material with the fatty acid compound.

(Amylose binding ratio in starchy material with fatty acid compound) = [{(Affinity of unaltered starchy material for iodine) − (Affinity of treated starchy material for iodine)}/(Affinity of unaltered starchy material for iodine)] × 100(%)

If the amylose binding ratio is less than 10% in the starchy material with the fatty acid compound, there is the possibility that the required decrease of the enzymatic digestion ratio with the amylose to a level of not more than 95% of the unaltered starchy material will not be obtained and the sufficient retardation of digestion and absorption aimed at by the material for food will not be attained. If the amylose binding ratio exceeds 70%, though the retardation of the speed of digestion and absorption is substantially the same as when this ratio is below 70%, the excess possibly impairs the flavor and texture on eating and boosts the cost. Thus, the amylose binding ratio is desired to be in the range of from 10 to 70%.

It has been known heretofore that the addition of a fatty acid ester, one species of fatty acid compound, in a small amount as an emulsifier to flour or rice powder contributes to improving expansibility of the dough made with the flour, augmenting palatability of the pastry made with the dough, and enhancing stability of these foodstuffs to resist the oxidation by aging. It has never been known to the art that retardation of digestion and absorption is attained successfully by using a fatty acid compound in a relatively large amount and causing this fatty acid compound to bind itself with a starchy material in an amount exceeding a specific lower limit, namely in an amount enough to give an amylose binding ratio of not less than 10% in starchy material.

The material for food of this invention using a fatty acid compound of the type mentioned above as a modifier can be produced by establishing contact between a starchy material having an amylose content in the range of from about 25 to about 60% by weight and a fatty acid compound in the presence of a solvent. For example, this production is accomplished by a procedure which comprises adding the fatty acid compound dissolved or dispersed in advance in a solvent to the starchy material of the aforementioned amylose content as a raw material thereby effecting the contact of the starchy material with the fatty acid compound in the presence of the solvent.

The solvent to be used is added for the purpose of creating uniform and efficient contact between the starchy material and the fatty acid compound. It is, therefore, desired to be a hydrophilic solvent exhibiting high affinity for the starchy material and obtaining uniform dispersion in the fatty acid compound. To be specific, the solvents which are advantageously usable herein include water, alcohol, glycerin, alkylene glycol, and acetone, for example. They may be used either singly or Jointly in the form of a mixture of two or more members selected properly to suit the quality of the fatty acid compound to be used. Though the amount of the solvent to be used is variable with the kind of the starchy material to be used, especially the amylose content of the starchy material, and the kind of the fatty acid compound and that of the solvent, it is desired to be in the range of from 10 to 10,000 parts by weight, based on 100 parts by weight of the starchy material. The amount of the fatty acid compound to be dissolved or dispersed in advance in the solvent is desired to be in the range of from 0.5 to 20 parts by weight, based on 100 parts by weight of the starchy material having an amylose content in the range of from about 25 to about 60% by weight. The reason for limiting the amount of the fatty acid compound to be added per 100 parts by weight of the starchy material to the range mentioned above is that the possibility of the fatty acid compound failing to effect fully satisfactory retardation of the speed of digestion and absorption will grow in spite of the union managed to be established between the starchy material and the fatty acid compound if the amount mentioned above is less than 0.5 parts by weight and the fatty acid compound has the possibility of degrading the flavor and palatability of the produced material for food if this amount exceeds 20 parts by weight. When a starchy material having an amylose content in the range of from about 25 to about 60% by weight is used as contemplated by this invention, the produced material enables the fatty acid compound used even in a relatively in a small amount to bring about fully satisfactory modification of the starchy material and proves to be advantageous in terms of the effect on vital system, the flavor and palatability, and the cost as compared with the material using an ordinary starchy material having an amylose content of less than 25% by weight.

The temperature of the reaction system for contact between the raw materials, i.e. a starchy material and a fatty acid compound, has no particular restriction except for the sole requirement that it should be incapable of solidifying the solvent used therein. When the material for food to be obtained is destined to be cooked by application of heat, the temperature of the reaction system must be short of completely gelatinizing the starchy material being used as a raw material. In this case, by reason of economy, this temperature is desired to be not lower than 0° C. and not higher than the gelatinization-initiating temperature (generally falling approximately between 60° C. and 70° C., though variable with the kind of starchy material), i.e. the temperature at which no gelatinization is suffered to occur. Incidentally, the complex formation of the fatty acid compound with the starchy material can be attained by adding the fatty acid compound dissolved or dispersed in advance in a solvent to the starchy material thereby establishing contact between the starchy material and the fatty acid compound at a temperature not higher than the gelatinization-initiating temperature. When the starchy material has the fatty acid compound bound thereto in the temperature range mentioned above, since the gelatinizing temperature of its own is elevated, the produced material on being cooked by application of heat succumbs to gelatinization only with difficulty and encourages retardation of digestion and absorption. In contrast, when the material for food is destined to be consumed without being cooked by application of heat, the reaction system can be operated naturally at a temperature exceeding the gelatinization-initiating temperature.

In the case of binding the fatty acid compound to the starchy material of the aforementioned amylose content, the solvent which remains in the starchy material at the end of the procedure described above may be removed, when necessary, by varying methods of drying such as, for example, freeze drying, vacuum drying, and drying in draft.

The production of the material for food of the present invention with the aforementioned fatty acid compound used as a modifier may be accomplished by adding the fatty acid compound to the starchy material dispersed in advance in a solvent thereby establishing contact between the starchy material and the fatty acid compound in the presence of the solvent or alternatively by simultaneously adding the starchy material and the fatty acid compound to a solvent and allowing them to be dissolved or dispersed in the solvent thereby establishing contact between the starchy material and the fatty acid compound in the presence of the solvent. In this case, the kind and amount of the solvent to be used and the temperature condition of the treatment are similar to those adopted in the method described previously.

Preferably, the production of the material for food of the present invention with the aforementioned fatty acid compound used as a modifier may be attained by the method which comprises kneading the starchy material having an amylose content in the range of from about 25 to about 60% by weight with the fatty acid compound in the presence of a solvent at a temperature incapable of gelatinizing the starchy material under a pressure exceeding 1 kgf/cm$^2$.

When the starchy material having an amylose content in the range of from about 25 to about 60% by weight and the fatty acid compound are kneaded under an increased pressure, namely a pressure exceeding 1 kgf/cm$^2$, the use of the solvent in a small amount falling approximately in the range of from 2 to 10 parts by weight, based on 100 parts by weight of the starchy material mentioned above suffices to effect fully satisfactory binding of the fatty acid compound with the starchy material. Even in this method, the amount of the fatty acid compound relative to that of the starchy material is substantially similar to that which is used in the other methods described previously. In the method now under discussion, since the amount of the solvent to be used is small, the kneaded mixture can be dried with enhanced efficiency, the otherwise possible denaturation of the starchy material can be curbed, and the improvement in quality of the product and the improvement in yield of the product can be fulfilled.

The amount of the solvent to be added in this method, as described above, is in the range of from 1 to 20 parts by weight, preferably from 5 to 15 parts by weight, based on 100 parts by weight of the starchy material, though it is variable with the pressure applied in the course of the kneading, the kind of the solvent to be used, and the kind of the starchy material and that of the fatty acid compound. The reason for limiting the amount of the solvent to the aforementioned range is that the kneading performed even under application of an increased pressure has the possibility of failing to bring about fully satisfactory union between the starchy material having an amylose content in the range of from about 25 to about 60% by weight and the fatty acid compound if the amount of the solvent is less than 1 part by weight, based on 100 parts by weight and the kneaded mixture is dried with poor efficiency and the starchy material possibly succumbs to denaturation as with swelling if the amount exceeds 20 parts by weight.

In the present method, the raw material comprising the starchy material having an amylose content in the range of from about 25 to about 60% by weight and the fatty acid compound is desired to be homogeneously mixed and made to incorporate therein the solvent by way of preparation. This pretreatment is not always necessary. It is allowable for all of these components to be simply combined at the time that the kneading is started under application of a pressure.

Though the pressure to be used during the step of kneading in the present method is required only to exceed 1 kgf/cm$^2$, it is desired to fall in the range of from 2 to 20 kgf/cm$^2$, preferably in the range of from 2 to 8 kgf/cm$^2$. The reason for limiting the pressure to the aforementioned range is that the starchy material has the possibility of succumbing to gelatinization if the pressure is unduly high.

The temperature at which the kneading is carried out under application of the pressure just mentioned is desired to be incapable of gelatinizing the starchy material. Specifically, this temperature generally falls approximately in the range of from 5° to 50° C., though the gelatinization-initiating temperature of the starchy material varies with the kind of starchy material and the pressure condition and therefore defies definition.

The time to be spent for the kneading under application of the pressure mentioned above generally falls in the range approximately from 0.1 to 10 minutes, though it is affected by such conditions as pressure, temperature, and revolution number and, therefore, cannot be generally defined.

The apparatus to be used for the kneading under the pressure mentioned above is not particularly restricted. A continuous kneading device which is commercially available may be effectively used.

The material prepared by the kneading carried out under the pressure as described above, when necessary, may be given a drying treatment in the same manner as used in the method described previously. This drying treatment can be carried out very easily and quickly because the amount of the solvent to be used during the kneading treatment in this method is small as mentioned above.

The material for food of the present invention, when necessary, is allowed to incorporate therein vitamins, minerals, spice, thickener, proteins and dietary fibers in small amounts in addition to the starchy material having an amylose content in the range of from about 25 to about 60% by weight and the saccharide other than D-glucose or the fatty acid compound as a modifier.

The material for food of the present invention, no matter which of the aforementioned methods may have been adopted for its production, can be used in the same manner as an ordinary starchy material because it is incapable of impairing the flavor and palatability of the starchy material used as a raw material therefor. To be specific, this material can be directly ingested as food and also can be applied to all foodstuffs which are manufactured with an ordinary starchy material. When this material for food is so processed as to produce the foodstuffs, it may be subjected, when necessary, to various treatments such as washing, grinding, and heat application.

Particularly, noodles of slow digestion and absorption can be produced by drying and grinding the material for food of the present invention, mixing the resultant dry powder, when necessary, with saccharides such as dextrin, table salt, brine, coloring matter, proteins, various minerals and vitamins, and kneading the resultant blend with added water.

Breads or cakes of slow digestion and absorption can be produced by drying and grinding the material for food of the present invention, mixing the resultant dry powder with oils and fats, saccharides, milk powder, eggs, a leavening agent such as baking powder, table salt, yeast, yeast food, and an oxyreducing agent such as L-ascorbic acid, and baking the resultant blend.

The food using the material for food of this invention obtained as described above compares favorably in terms of flavor and texture with that containing ordinary starchy material and has significantly slow speeds of digestion and absorption. As an antiobesity food or as a food for patients of diabetes, this food is advantageously used. Further, the food which uses the material of this invention can be favorably used by animals other than man as well.

EXAMPLES

Now, the present invention will be described more specifically below with reference to working examples, which are illustrative of and not in any sense limitative of this invention.

Example 1

A starchy raw material having an amylose content of about 25% was prepared by mixing 930 g of commercially available flour (having an amylose content of about 22%) with 70 g of high-amylose corn starch (having an amylose content of about 70%).

A sample material for food was obtained by adding to 1 kg of the starchy raw material prepared as described above a solution prepared in advance by dissolving 15 g of sorbitan laurate (produced by Kao Soap Co., Ltd. and marketed under trademark designation of "Emasol L-10") in 5 liters of water, keeping the resultant mixture autoclaved at 121° C. for 20 minutes, and thereafter freeze drying the autoclaved mixture.

The sample material so produced was tested for amylose binding ratio in starchy material with the fatty acid compound, digestibility with PPA, and texture on eating by the methods which are described specifically hereinbelow. The results are shown in Table 1. For comparison in digestibility with PPA, a material produced by mixing the starch raw material prepared in the same manner as described above with 5 liters of water not containing the sorbitan laurate, keeping the resultant mixture autoclaved at 121° C. for 20 minutes, and thereafter freeze drying the autoclaved mixture was used as a control sample.

Example 2

A sample material for food was obtained by following the procedure of Example 1, except a starchy raw material having an amylose content of about 30% was prepared by using 833 g of commercially available flour (having an amylose content of about 22%) and 167 g of high-amylose corn starch (having an amylose content of about 70%) instead. The sample material was tested for amylose binding ratio in starchy material with the fatty acid compound, digestibility with PPA, and texture on eating by the methods which will be described specifically hereinbelow. The results are shown in Table 1. For comparison in digestibility with PPA, a material produced by treating a starchy raw material prepared as described above in a system not containing the sorbitan laurate similarly to the comparative experiment of Example 1 was used as a control sample.

Example 3

A sample material for food was obtained by following the procedure of Example 1, except a starchy raw material having an amylose content of about 45% was prepared by using 520 g of commercially available flour (having an amylose content of about 22%) and 480 g of high-amylose corn starch (having an amylose content of about 70%) instead. The sample material was tested for amylose binding ratio in starchy material with the fatty acid compound, digestibility with PPA, and texture on eating by the methods which will be described specifically hereinbelow. The results are shown in Table 1. For comparison in digestibility with PPA, a material produced by treating a starchy raw material prepared as described above in a system not containing the sorbitan laurate similarly to the comparative experiment Example 1 was used as a control sample.

Example 4

A sample material for food was obtained by following the procedure of Example 1, except a starchy raw material having an amylose content of about 60% was prepared by using 208 g of commercially available flour (having an amylose content of about 22%) and 792 g of high-amylose corn starch (having an amylose content of about 70%) instead. The sample material was tested for amylose binding ratio in starchy material with the fatty acid compound, digestibility with PPA, and texture on eating by the methods which will be described specifically hereinbelow. The results are shown in Table 1. For comparison in digestibility with PPA, material produced by treating a starchy raw material prepared as described above in a system not containing the sorbitan laurate similarly to the comparative experiment of Example 1 was used as a control sample.

Control 1

A sample material for food was obtained by following the procedure of Example 1, except 1 kg of commercially available flour (having an amylose content of about 22%) was used alone as a starchy raw material. The sample material for food was tested for amylose binding ratio in starchy material with fatty acid compound, digestibility with PPA, and texture on eating by the methods which will be described specifically hereinbelow. The results are shown in Table 1. For comparison in digestibility with PPA, a material produced by treating the flour in a system not containing the sorbitan laurate similarly to the comparative experiment of Example 1 was used as a control sample.

Control 2

A sample material for food was obtained by following the procedure of Example 1, except 1 kg of commercially available high-amylose corn starch (having an amylose content of about 70%) was used alone as a starchy raw material. The sample material was tested for amylose binding ration in starchy material with fatty acid compound, digestibility with PPA, and texture on eating by the methods which will be described specifically hereinbelow. The results are shown in Table 1. For comparison in digestibility with PPA, a material produced by treating a starchy raw material prepared as described above in a system not containing the sorbitan laurate ester similarly to the comparative experiment of Example 1 was used as a control sample.

TABLE 1

|  | Amylose content | Amylose binding ratio | Decomposability with PPA (relative to control) | Texture |
|---|---|---|---|---|
| Control 1 | 22% | 38% | 96% | Excellent |
| Example 1 | 25% | 30% | 93% | Excellent |
| Example 2 | 30% | 27% | 87% | Excellent |
| Example 3 | 45% | 21% | 70% | Fair |
| Example 4 | 60% | 10% | 59% | Fair |
| Control 2 | 70% | 8% | 45% | Poor* |

*In the sensory test performed on the sample material from Control 2, some panel members complained of loose passage, abdominal inflation, and crepitus.

It is clearly noted from Table 1 that the materials for food obtained in Examples 1 to 4 of the present invention using starchy materials having amylose contents in the range of from about 25 to about 60% by weight showed larger ratios of reduction in decomposability with PPA and produced higher effects in retarding the speed of digestion and absorption than the material using ordinary flour (Control 1) while exhibiting amylose binding ratios equaling to or higher than the conventional material. The decline of texture and the inclination to inferior digestion which were observed in the material using high-amylose corn starch of a very high amylose content (Control 2) were absent from these materials conforming to the present invention.

Example 5

A starchy raw material having an amylose content of about 27% was prepared by mixing 900 g of commercially available flour (having an amylose content of about 22%) and 100 g of high-amylose corn starch (having an amylose content of about 70%).

A sample material for food was produced by mixing 1 kg of the starchy raw material thus prepared with 100 ml of water having 5 g of sucrose palmitate (produced by Mitsubishi Chemical Industries, Ltd. and marketed under trademark designation of "Ryoto P-1570") dissolved in advance therein, continuously kneading the resultant mixture at 25° C. under an increased pressure of 2 kg/cm$^2$ for an average period of 5 minutes, and thereafter freeze drying the resultant blend.

The sample material was tested for amylose binding ratio in starchy material with the fatty acid compound and digestibility with PPA by the methods which will be described specifically hereinbelow. For comparison in digestibility with PPA, a material produced by the same treatment as described above, except the starchy raw material prepared as described above was mixed with 100 ml of water not containing the sucrose palmitate, was used as a control sample. In the case of the sample material, the amylose binding ratio in starchy material with the fatty acid compound was 15% and the digestibility with PPA was lowered to 89% of that of the control sample.

Control 3

A sample material for food was produced by following the procedure of Example 5, except 1 kg of commercially available flour was used as a starchy raw material.

The sample material was tested for amylose binding ratio in starchy material with fatty acid compound and digestibility with PPA by the methods which will be described specifically hereinbelow. For comparison in digestibility with PPA, a material produced by the same treatment as described above, except the flour was mixed with 100 ml of water not containing the sucrose palmitate, was used as a control sample. In the case of the sample material, the amylose binding ratio in starchy material with the fatty acid compound was 18%, a value substantially equal to that of the sample material of Example 5 and the decomposability with PPA was lowered to 98% of the control sample.

Example 6

A starchy raw material of an amylose content of about 30% was prepared by mixing 870 g of commercially available rice powder (having an amylose content of about 24%) with 130 g of high-amylose corn starch (having an amylose content of about 70%).

A sample material for food was produced by mixing 1 kg of a starchy raw material prepared as described above with a solution prepared in advance by dissolving 200 g of glycerin monostearate (produced by Riken Vitamins K.K. and marketed under trademark designation of "Emulsy-MS"), keeping the resultant mixture heated at 80° C. for 60 minutes, and thereafter freeze drying the heated mixture.

The sample material was tested for amylose binding ratio in starchy material with the fatty acid compound and digestibility with PPA. For comparison in digestibility with PPA, a material produced by mixing a starchy raw material prepared in the same manner as described above with 20 liters of water not containing the glycerin monostearate, heating the resultant mixture at 80° C. for 60 minutes, and thereafter freeze drying the heated mixture was used as a control sample. In the case of the sample material, the amylose binding ratio in starchy material with the fatty acid compound was 75% and the decomposability with PPA was lowered to 69% of the control sample.

Control 4

A sample material for food was produced by following the procedure of Example 6, except 1 kg of commercially available rice powder was used alone as a starchy raw material.

The sample material was tested for amylose binding ratio in starchy material with the fatty acid compound and digestibility with PPA. For comparison in digestibility with PPA, a material produced by mixing the rice powder with 20 liters of water not containing the glycerin monostearate, heating the resultant mixture at 80° C. for 60 minutes, and thereafter freeze drying the heated mixture was used as a control sample. In the case of the sample material, the amylose binding ratio in starchy material with the fatty acid compound was 95%, a value substantially equal to that obtained with the sample material of Example 6, and the decomposability with PPA was lowered only to 80% of that of the control sample.

Control 5

One (1) kg of a starchy raw material of an amylose content of about 30% prepared in the same manner as in Example 6 was mixed solely with 200 g of glycerin monostearic ester (produced by Riken Vitamins K.K. and marketed under trademark designation of "Emulsy-MS").

The sample thus obtained was tested for amylose binding ratio in starchy material with fatty acid compound in accordance with the method which will be described specifically hereinbelow. The amylose binding ratio in starchy material with fatty acid compound was found to be 8%. This fact indicates that substantially no complex of the fatty acid compound with the starchy material was obtained by merely mixing the fatty acid compound with the starchy material.

Examples 7 to 10

A starchy raw material having an amylose content of about 25% was prepared by mixing 930 g of commercially available flour (having an amylose content of about 22%) with 70 g of high-amylose corn starch (having an amylose content of about 70%).

Sample materials for food were obtained by mixing 50 g of the starchy raw material prepared as described above with 5 liters of water having glycerin monostearate (produced by Riken Vitamins K.K. and marketed under trademark designation of "Emulsy-MS") dissolved in advance therein in a varying amount indicated in Table 2, keeping the resultant mixture stirred at 65° C. for 60 minutes, and thereafter centrifuging the stirred mixture at 3,000 rpm for three minutes thereby expelling the supernatant.

The sample materials thus obtained were tested for amylose binding ratio in starchy material with the fatty acid compound and digestibility with PPA by the methods which will be described specifically hereinbelow. The results are shown in Table 2. For comparison in digestibility with PPA, a sample material for food obtained by mixing a starchy raw material prepared as described above with 5 liters of water not containing the glycerin monostearate, stirring the resultant mixture at 65° C. for 60 minutes, and thereafter centrifuging the stirred mixture at 3,000 rpm for three minutes thereby expelling the supernatant was used as a control sample.

TABLE 2

|  | Amount of fatty acid ester added | Amylose binding ratio | Decomposability with PPA |
| --- | --- | --- | --- |
| Example 7 | 1.0 g | 27% | 85% |
| Example 8 | 2.5 g | 41% | 69% |
| Example 9 | 5.0 g | 55% | 48% |
| Example 10 | 10.0 g | 65% | 39% |

Examples 11 to 13

A starchy raw material having an amylose content of about 30% was prepared by mixing 870 g of commercially available flour (having an amylose content of about 22%) with 130 g of high-amylose corn starch (having an amylose content of about 70%).

A sample material for food was produced by mixing 100 g of the starchy raw material prepared as described above with 300 ml of water having 5 g of sucrose stearate (produced by Mitsubishi Chemical Industries, Ltd. and marketed under product code of "S-970") dissolved in advance therein, retaining the resultant mixture at a varying temperature indicated in Table 3 for 60 minutes, and thereafter vacuum drying the mixture at 50° C.

The sample material thus obtained was heat-treated at 95° C. for 30 minutes and then tested for amylose binding ratio in starchy material with the fatty acid compound and digestibility with PPA by the methods which will be described specifically hereinbelow. The results are shown in Table 3. For comparison in digestibility with PPA, a material produced by preparing a starchy raw material as described above and heat-treating this starchy raw material at 95° C. for 30 minutes was used as a control sample.

TABLE 3

|  | treating temperature | Amylose binding ratio | Decomposability with PPA |
| --- | --- | --- | --- |
| Example 11 | 5° C. | 37% | 68% |
| Example 12 | 45° C. | 50% | 65% |
| Example 13 | 90° C. | 52% | 64% |

Example 14

A starchy raw material having an amylose content of about 30% was prepared by mixing 8.3 kg of commercially available flour (having an amylose content of about 22%) with 1.7 kg of high-amylose corn starch (having an amylose content of about 70%). Then, 10 kg of the starchy raw material was homogeneously mixed with 200 g of glycerin monocleate (produced by Riken Vitamins K.K. and marketed under trademark designation of "Emulsy-OL"). In a continuous kneading device (produced by Kurimoto Tekkojo K.K. and marketed under product code of "S2"), the resultant mixture and water added thereto in a ratio of 200 ml per kg of the mixture were kneaded under a pressure of 2 kgf/cm². The kneading was continued for one minute. The temperature of the produced blend was 39° C. at the outlet of the device. A sample material for food was produced by placing the blend in a hot air drier, drying it therein at 60° C. for 30 minutes, and thereafter pulverizing the dry blend until a particle diameter of 100 μm was obtained.

The sample material thus obtained was tested for digestibility (gelatinized in advance) with porcine pancreatic α-amylase (PPA) by the method which will be described specifically hereinbelow. The results are shown in Table 4.

Example 15

A starchy raw material having an amylose content of about 30% was prepared by mixing 8.7 kg of commercially available polished rice powder (having an amylose content of about 24%) with 1.3 kg of high-amylose corn starch (having an amylose content of about 70%). Then, 10 kg of the starchy raw material was homogeneously mixed with 500 g of sorbitan laurate (produced by Kao Soap Co., Ltd. and marketed under trademark designation of "Emasol L-10"). In a continuous kneading device (produced by Kurimoto Tekkojo K.K. and marketed under product code of "S2"), the resultant mixture and water added thereto in a ratio of 50 ml per kg of said mixture were kneaded under a pressure of 5 kgf/cm². The kneading was continued for a period of 2.5 minutes. The temperature of the resultant blend was 44° C. at the outlet of the device. A sample material for food was obtained by drying and pulverizing the blend in the same manner as in Example 14.

This sample material was tested for digestibility with PPA in the same manner as in Example 14. The results are shown in Table 4.

Control 6

A sample material for food was prepared by following the procedure of Example 14, except the pressure used during the kneading was changed to 1 kgf/cm². This sample material was tested for digestibility with PPA. The results are shown in Table 4.

Control 7

A sample material for food was prepared by following the procedure of Example 14, except the amount of water added during the kneading was changed to 5 ml per kg of the mixture. The sample material was tested for digestibility with PPA. The results were shown in Table 4.

Control 8

A sample material for food was prepared by following the procedure of Example 14, except the amount of water added during the kneading was changed to 400 ml per kg of the mixture. The sample material was tested for digestibility with PPA. The results are shown in Table 4.

The sample material for food obtained in Control 8 had the starch component thereof swelled therein. The food produced by heat-treating this sample material was inferior in texture to the foods produced by heat-treating the sample materials obtained in Examples 14 and 15 and Controls 6 and 7.

Referential Example

For the purpose of reference, a sample material for food was produced by using a starchy raw material having an amylose content of less than 25%.

To be specific, 10 kg of commercially available flour (having an amylose content of 22%) was homogeneously mixed with 200 g of glycerin monocleate (produced by Riken Vitamins K.K. and marketed under trademark designation of "Emulsy-OL"). In a continuous kneading device (produced by Kurimoto Tekkojo K.K. and marketed under product code of "S2"), the resultant mixture and water added thereto in a ratio of 200 ml per kg of the mixture were kneaded under a pressure of 2 kg/cm². This kneading was continued for a period of one minute. The temperature of the resultant blend was 28° C. at the outlet of the device. A sample material for food was produced by placing the blend in a hot air drier, drying it therein at 60° C. for 30 minutes, and pulverizing the dry blend until a particle diameter of 100 μm was obtained.

The resultant sample material was tested for digestibility(gelatinized in advance) with PPA in accordance with the method which will be described specifically hereinbelow. The results were shown in Table 4.

TABLE 4

|  | Decomposability with PPA (relative to control) |
|---|---|
| Example 14 | 85% |
| Example 15 | 83% |
| Control 6 | 96% |
| control 7 | 98% |
| Control 8 | 85% |
| Referential Example |  |

*In the sensory test performed on the sample material from Control 2, some panel members complained of loose passage, abdominal inflation, and crepitus.

Example 16

A starchy raw material of an amylose content of about 30% was prepared by mixing 870 g of commercially available rice powder (having an amylose content of about 24%) with 130 g of high-amylose corn starch (having an amylose content of about 70%).

The starchy raw material thus prepared was thoroughly mixed with 1 liter of an aqueous 15 w/v % ethanol solution having 10 g of xylose and 1 g of citric acid dissolved in advance therein and the resultant homogeneous mixture was dried in a constant temperature vacuum drier at 60° C. for two hours. At the end of the treatment in the vacuum drier, the dried mixture had a water content of 2.0% by weight. The dried mixture was treated at 160° C. under a reduced pressure of 40 mmHg for four hours and washed once with 1,000 ml of an aqueous 50 w/v % ethanol solution, to afford a sample material for food.

The sample material was tested for digestibility with PPA by the method which will be described specifically hereinbelow. The decomposability with PPA was 85% of that of the unaltered starchy raw material.

Control 9

A sample material for food was obtained by following the procedure of Example 16, except 1 kg of commercially available rice powder was used as a starchy raw material.

The sample material was tested for digestibility with PPA by the method which will be described specifically hereinbelow. The decomposability with PPA was 92% of the unaltered rice powder.

Example 17

A starchy raw material was prepared by mixing 833 g of commercially available flour (having an amylose content of about 22%) with 167 g of high-amylose corn starch (having an amylose content of about 70%).

The starchy raw material prepared as described above was thoroughly mixed with 100 ml of water having 50 g of fructose and 5 g of phosphoric acid dissolved in advance therein and dried in a hot air drier at 60° C. for two hours. At the end of this treatment, the dried mixture had a water content of 3.5% by weight. Then, the dry mixture was treated at 220° C. under a reduced pressure of 40 mmHg for 30 minutes, washed six times with 90 ml of an aqueous 50 w/v % ethanol solution, and dried, to afford a sample material for food.

The sample material was tested for digestibility with PPA by the method which will be described specifically hereinbelow. The decomposability with PPA was 68% of that of the unaltered starchy raw material.

Control 10

A sample material for food was obtained by following the procedure of Example 17, except 1 kg of commercially available flour was used as a starchy raw material.

The sample material thus obtained was tested for digestibility with PPA by the method which will be described hereinbelow. The decomposability with PPA was 85% of that of the unaltered flour.

Example 18

A starchy raw material was prepared by mixing 52 g of commercially available flour (having an amylose content of about 22%) with 48 g of high-amylose corn starch (having an amylose content of about 70%).

The starchy raw material thus prepared and 300 g of water having 5 g of sucrose stearate (produced by Mitsubishi Chemical Industries, Ltd. and marketed under product code of "S-1570") suspended in advance therein at 65° C. were kept stirred at 30° C. for 60 minutes. The resultant mixture was wholly freeze dried, to afford a sample material for food. The digestibility of this sample material for food with PPA was 62% of that of the unaltered starchy raw material.

A sample solution produced by autoclaving 50 g of the sample material and 150 ml of water at 121° C. for 30 minutes was orally administered to one healthy man. At stated intervals following the administration, the blood of the man was sampled and analyzed for blood sugar. The determination of blood sugar was performed by the use of a commercially available measuring instrument (produced by Aims-Sankyo K.K. and marketed under trademark designation of "Glucoster").

As a result, the blood of the subject who had ingested the sample solution showed a clear retardation of the rise of blood sugar as evinced by 53% of surface area and 65% of peak height as compared with the blood of a subject who had ingested a control sample solution produced simply by heating a starchy raw material (having an amylose content of 45%) prepared as described above at 121° C. for 30 minutes.

Control 10

A sample material for food was obtained by following the procedure of Example 17, except 100 g of commercially available flour was used as a starchy raw material. The digestibility of the sample material for food with PPA was 85% of the unaltered flour.

A sample solution produced by autoclaving 50 g of the sample material and 150 ml of water at 121° C. for 30 minutes was orally administered to one healthy man. After the administration, the blood of the man was periodically analyzed for change of blood sugar.

As a result, the blood of the subject who had ingested the sample solution showed a retardation of the rise of blood sugar as evinced by 85% of surface area and 88% of peak height as compared with the blood of a subject who had ingested a control sample solution (produced simply by heating flour at 121° C. for 30 minutes). The degree of this retardation, however, was small as compared with that obtained in Example 17.

Example 19

A sample material for food was obtained by following the procedure of Example 18, except glycerin monocleate (produced by Riken Vitamins K.K. and marketed under trademark designation of "Emulsy-OL") was used in the place of sucrose stearic ester. The digestibility of this sample material for food with PPA was 58% of that of the unaltered starchy raw material.

A sample solution produced and treated in the same manner as in Example 18 was orally administered to one healthy man. After the administration, the blood of the man was periodically analyzed for change of blood sugar. The determination of the blood sugar was performed by the use of a commercially available measuring instrument (produced by Aims-Sankyo K.K. and marketed under trademark designation of "Glucoster").

As a result, the blood of the subject who had ingested the sample solution showed a clear retardation of the rise of blood sugar as evinced by 65% of surface area and 68% of peak height as compared with the blood of a subject who had ingested a sample solution produced by simply heating a starchy raw material (having an amylose content of 45%) prepared as described above at 121° C. for 30 minutes.

Control 11

A sample material for food was obtained by following the procedure of Example 19, except 100 g of commercially available flour was used as a starchy raw material. The digestibility of the sample material for food was 82% of that of the unaltered flour.

A sample solution produced and treated in the same manner as in Example 19 was orally administered to one healthy man. After the administration, the blood of the man was periodically analyzed for change of blood sugar.

As a result, the blood of the subject who had ingested the sample solution showed a retardation of the rise of blood value as evinced by 81% of surface area and 85% of peak height as compared with the blood of a subject who had ingested a control sample solution produced by simply heating flour at 121° C. for 30 minutes. The degree of this retardation, however, was small as compared with that obtained in Example 19.

Example 20

A starchy raw material having an amylose content of about 22% was prepared by mixing 870 g of commercially available flour (having an amylose content of about 22%) with 130 g of high-amylose corn starch (having an amylose content of about 70%).

A sample material for food was produced by stirring 1 kg of the starchy raw material obtained as described above and 3 liters of water having 100 g of glycerin monostearate (produced by Riken Vitamins K.K. and marketed under trademark designation of "Emulsy-MS") dissolved in advance therein at 45° C. for 30 minutes, decanting the resultant mixture thereby discarding the supernatant, and freeze drying the residue of decantation.

A bread mix was prepared by mixing 1 kg of the sample material for food obtained as described above with 75 g of oil, 75 g of sugar, and 60 g of milk casein. When 280 g of the bread mix and 3 g of dry yeast added thereto were cooked with a commercially available baking device, there was obtained bread of highly satisfactory flavor and texture on eating. A panel of several volunteers for blind trial were asked to ingest the bread produced with the starchy raw material and the bread produced with unprocessed flour in the same manner as described above and make their choice between the two breads. No significant difference was found in their choices.

Example 21

A starchy raw material having an amylose content of about 30% was prepared by mixing 870 g of commercially available flour (having an amylose content of about 22%) with 130 g of high-amylose corn starch (having an amylose content of about 70%).

A sample material for food was produced by mixing 1 kg of the starchy raw material with 150 g of sucrose stearate (produced by Mitsubishi Chemical Industries, Ltd. and marketed under product code of "S-1570"), continuously kneading the resultant mixture with water added thereto in a ratio of 15% based on the raw material (for an average period of five minutes), drying the resultant blend with hot air at 60° C., and pulverizing the dry blend until an average particle diameter of 100 μm was obtained.

A hot cake mix was obtained by thoroughly mixing 78 g of the sample material with 9 g of sugar, 1.5 g of powdered egg white, 7 g of flour gluten, 0.5 g of table salt, 2.5 g of a leavening agent, and 1.5 g of spice. When this mix was baked as conventionally practiced, there was obtained hot cakes excellent in flavor and texture on eating. A panel of several volunteers for blind trial were asked to ingest the hot cakes using the processed starchy raw material and hot cakes obtained with unprocessed flour in the same manner as described above and make their choice between the two kinds of hot cakes. No significant difference was found in their choices.

Example 22

A starchy raw material of an amylose content of about 33% was obtained by mixing 800 g of commercially available rice powder (having an amylose content of about 24%) with 200 g of high-amylose corn starch (having an amylose content of about 70%).

A sample material for food was produced by mixing 1 kg of the starchy raw material thus obtained with 3 liters of water having 50 g of sucrose stearate (produced by Mitsubishi Chemical Industries, Ltd. and marketed under product code of "S-1570") dissolved in advance therein, stirring the resultant mixture at 30° C. for one hour, decanting the mixture thereby discarding the supernatant, and freeze drying the residue of decantation.

An inflated food having highly satisfactory flavor and texture on eating was obtained by thoroughly mixing 90 g of the sample material thus prepared with 3 g of powdered oil, 5 g of maize fibers, and 2 g of ground egg shell, combining the resultant mixture with water suitably, and extruding the resultant blend through a twin arm extruder at a temperature in the range of from 120° to 130° C. under an extruding pressure in the range of from 20 to 25 kgf/cm². A panel of several volunteers for blind trial were asked to ingest the inflated food produced with the processed starchy raw material and the inflated food produced with unprocessed rice powder in the same manner as described above and make their choice between the two inflated foods. No significant difference was recognized in their choices.

Example 23

A starchy raw material having an amylose content of about 41% was prepared by mixing 600 g of commercially available flour (having an amylose content of about 22%) with 400 g of high-amylose corn starch (having an amylose content of about 70%).

A sample material for food was produced by mixing 1 kg of the starchy raw material thus prepared with 10 liters of water having 100 g of glycerin monostearate (produced by Riken Vitamins K.K. and marketed under trademark designation of "Emulsy-MS") dissolved in advance therein, stirring the resultant mixture at 10° C. for two hours, decanting the resultant mixture thereby discarding the supernatant, and freeze drying the residue of decantation.

A blended dough was obtained by combining 800 g of the sample material thus prepared with 20 g of dextrin (produced by Matsutani Kagaku K.K. and marketed under trademark designation of "Pinedex 4"), 30 g of vital gluten (produced by Showa Sangyo K.K. and marketed under trademark designation of "Powder Glue A"), and 400 g of water and stirring the resultant mixture in a mixer.

Raw noodles were produced by doubling, rolling, and slicing the blended dough by the conventional method using a noodle roll. When 300 g of the raw noodles were boiled in boiling water, there were obtained boiled noodles which excelled in flavor and texture on eating.

A panel of several volunteers for blind trial were asked to ingest the boiled noodles produced with the processed starchy raw material and the boiled noodles produced with the unprocessed flour in the same manner as described above and make their choice between the two kinds of boiled noodles. No significant difference was found in their choices.

The methods used in the working examples of this invention for determination of various properties are as follows. Amylose binding ratio in starchy material with fatty acid compound:

A sample 0.1 g in weight is thoroughly diluted by stirring with 20 ml of 0.5N KOH for alkali gelatinization until all clusters cease to exist, combined with 150 ml of purified water, and neutralized with 20 ml of 1N HCl added thereto, to form a total of 190 ml of a sample solution. The sample solution 95 ml in volume is cooled with ice, mixed with 5 ml of 0.4N KI, kept under application of a voltage of 25 mV, and titrated with 0.00157N $KIO_3$ added thereto at a rate of 0.5 ml per minute to determine change of electric current. The point at which the electric current begins to rise suddenly is taken as a point of inflection and the amount of titrant added up to this point is taken as the value of titration. Separately, the total sugar content in 0.1 g of the sample is determined by the phenol-sulfuric acid method. The affinity of the sample for iodine is calculated based on the following formula using the value of titration and the total sugar content. Then, the amylose biding ratio in starchy material with the fatty acid compound is found in accordance with the next following formula.

(Affinity for iodine)(mg of iodine/100 mg of total sugar content)={(Value of titration)(ml)×20)/(Total sugar content)(mg)}×100

Amylose binding ratio in starchy material with fatty acid compound (%)=[{(Affinity of unprocessed starchy material for iodine)−(Affinity of processed starchy material for iodine)}/(Affinity of unprocessed starchy material for iodine)]×100

Digestibility with porcine pancreas α-amylase (PPA)

All samples including unprocessed starchy material samples used for control must be gelatinized in advance of the test for digestibility with PPA. In the samples obtained in the working examples of this invention, those not yet gelatinized because of low temperatures used during the addition of a modifier were gelatinized by being mixed with a phosphate buffer and then heated in a boiling water bath for 30 minutes. The unprocessed starchy material samples used for control were gelatinized by being heated under the same conditions as the samples of the working examples (naturally omitting addition of a modifier). The samples in the form of cereals were pulverized in advance of the test.

A gelatinized sample 0.5 g in weight is mixed with 49 ml of 50 mM phosphate buffer (pH 6.9) and the resultant mixture is left standing for 30 minutes in a shaken constant-temperature bath adjusted to 37° C. The shaken mixture is caused to initiate reaction by addition of 1 ml of an enzyme solution prepared by diluting PPA (produced by Sigma Corp.) with phosphate buffer to a concentration of 50 $\mu$U/ml. At intervals of 0, 20, 40, and 60 minutes following the start of the reaction, two specimens each 0.2 ml in volume were extracted from the bath and placed in test tubes containing 3.8 ml of 0.1N NaOH to stop the enzymatic reaction in process therein.

The determination of reducing sugar produced by the digestion with PPA is carried out by the Somogyi-Nelson Method.

Texture on eating

A panel of ten volunteers for monitor test were asked to ingest 30 g of a sample material for food produced in a working example or a control. The results were rated on the three-point scale, wherein "poor" stands for not more than five panel members, "fair" for six to eight panel members, and "excellent" for not less than nine panel members respectively who found agreeable texture on eating in the sample.

I claim:

1. A food additive material which is slowly adsorbed and digested which comprises:
   (1) a mixture of starches comprising (a) a cereal starch having an amylose content of less than 25% and (b) a starchy material having a high amylose content; and
   (2) a modifier which modifies the enzymatic reaction ratio with amylase such that it is not more than 95% as compared to an unmodified starch mixture; and
   wherein the ratio of the cereal starch and the high amylose content starch is selected such that the resultant starch mixture comprises an amylose content ranging from between 25% and 60% by weight.

2. A material according to claim 1, wherein said modifier is a saccharide other than D-glucose.

3. A material according to claim 1, wherein said modifier is a fatty acid compound.

4. A material according to claim 1, wherein said modifier is a fatty acid compound and the fatty acid is bound to said starch mixture having an amylose content in the range of from about 25 to about 60% by weight such that the amylose binding ratio with the fatty acid compound is not less than 10%.

5. A material according to claim 4, wherein said fatty acid compound is an amphipathic substance showing affinity for a solvent.

6. A material according to claim 4, wherein said fatty acid compound is an ester compound between a fatty acid of 8 to 22 carbon atoms and a polyhydric alcohol.

7. A material according to claim 1, 2, or 4, wherein said amylose content is in the range of from 30 to 50% by weight.

8. A material according to claim 1, 2, or 4, wherein said starchy material acquires an amylose content in the range of from about 25 to about 60% by weight by the combination of at least one starchy material prepared from the cereal selected from the group consisting of rice, corn, barley, rye, oat, maize, potato, sweet potato, and tapioca with high-amylose corn starch.

9. A method for the production of the said food additive material set forth in claim 2, comprising mixing said starch mixture having an amylose content in the range of from about 25 to about 60% by weight, a saccharide other than D-glucose, and an acid and heat-treating the resultant mixture.

10. A method according to any of claim 9, comprising estblishing contct between said starch material having an amylose content in the range of from about 25 to about 60% by weight and said fatty acid compound in the presence of a solvent.

11. A method according to claim 10, wherein said solvent is used in an amount in the range of from 10 to 10,000 parts by weight and said fatty acid compound in an amount in the range of from 0.5 to 20 parts by weight, respectively based on 100 parts by weight of said starch mixture having an amylose content in the range of from about 25 to about 60% by weight.

12. A method according to claim 10, wherein said solvent is at least one member selected from the group consisting of water, alcohol, glycerin, alkylene glycols, and acetone.

13. A method according to claim 10, comprising kneading 100 parts by weight of a starch mixture having an amylose content in the range of from about 25 to about 60% by weight and 0.5 to 20 parts by weight of a fatty acid compound in the presence of 1 to 20 parts by weight of a solvent at a temperature incapable of gelatinizing said starchy material under a pressure exceeding 1 kg/cm$^2$.

14. A method according to claim 13, wherein said pressure is in the range of from 2 to 20 kg/cm$^2$.

15. A method according to claim 13, wherein said solvent is at least one member selected from the group consisting of water, alcohol, glycerin, alkylene glycols, and acetone.

16. A method for the production of a bread or cake which is slowly digested and absorbed comprising drying and pulverizing a food additive material obtained by the method set forth in claim 10; combining the resultant dried powder with additional materials to produce a bread or cake mixture and baking the resultant bread or cake mixture to produce a bread or cake which upon digestion is slowly digested and absorbed.

17. A method for the production of noodles which are slowly digested and absorbed comprising drying and pulverizing a food additive material obtained by the method set forth in claim 10, optionally mixing the resultant dried powder with other materials to produce a noodle mixture and hydrating and kneading the resultant noodle mixture to produce noodles which upon ingestion are slowly digested and absorbed.

18. A food characterized by containing the said food additive material set forth in claim 1.

19. A food according to claim 18, which is suitable for administration to obese persons.

20. A food according to claim 18, which is a food suitable for administration to diabetics.

* * * * *

UNITED STATES PATENT AND TRADEMARK OFFICE
CERTIFICATE OF CORRECTION

PATENT NO. : 5,330,779
DATED : July 19, 1994
INVENTOR(S) : Makoto WATANABE

It is certified that error appears in the above-indentified patent and that said Letters Patent is hereby corrected as shown below:

In Column 6, line 22, delete "caprio" and insert -- capric --.
In Column 6, line 27, delete "linclic" and insert -- linolic --.
In Column 6, line 45, delete "palmirate" and insert -- palmitate --.
In Column 6, line 48, delete "monocleate" and insert -- monooleate --.
In Column 8, line 16, delete "Jointly" and insert -- jointly --.
In Column 17, line 50, delete "monocleate" and insert -- monooleate --.
In Column 19, line 67, delete "monocleate" and insert -- monooleate --.
In Column 22, line 42, delete ",of" and insert -- of --.
In Column 24, line 17, delete "any of".
In Column 24, line 18, delete "estblishing" and insert -- establishing --.
In Column 24, line 18, delete "contct" and insert -- contact --.
In Column 24, line 18, delete "material" and insert -- mixture --.

Signed and Sealed this

Eighteenth Day of October, 1994

Attest:

BRUCE LEHMAN

*Attesting Officer*   *Commissioner of Patents and Trademarks*